United States Patent
Sprenger

(10) Patent No.: US 11,745,625 B2
(45) Date of Patent: Sep. 5, 2023

(54) LONGITUDINAL ADJUSTER FOR A VEHICLE SEAT

(71) Applicant: ADIENT ENGINEERING AND IP GMBH, Burscheid (DE)

(72) Inventor: Erik Sprenger, Wermelskirchen (DE)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 458 days.

(21) Appl. No.: 16/638,163

(22) PCT Filed: Aug. 10, 2018

(86) PCT No.: PCT/EP2018/071724
§ 371 (c)(1),
(2) Date: Feb. 20, 2020

(87) PCT Pub. No.: WO2019/030369
PCT Pub. Date: Feb. 14, 2019

(65) Prior Publication Data
US 2022/0048408 A1    Feb. 17, 2022

(30) Foreign Application Priority Data
Aug. 11, 2017 (DE) ............ 10 2017 214 104.2

(51) Int. Cl.
*B60N 2/06* (2006.01)
*B60N 2/90* (2018.01)
(Continued)

(52) U.S. Cl.
CPC ......... *B60N 2/067* (2013.01); *B60N 2/0232* (2013.01); *B60N 2/0705* (2013.01); *B60N 2/929* (2018.02);
(Continued)

(58) Field of Classification Search
CPC ...... B60N 2/067; B60N 2/929; B60N 2/0232; B60N 2/0705; B60N 2002/0236
See application file for complete search history.

(56) References Cited

U.S. PATENT DOCUMENTS

| 5,797,293 A | * | 8/1998 | Chaban ............... F16H 25/24 74/89.36 |
| 6,220,642 B1 | * | 4/2001 | Ito .................. B60N 2/0232 296/65.14 |

(Continued)

FOREIGN PATENT DOCUMENTS

| CN | 1843803 A | 10/2006 |
| CN | 101544201 A | 9/2009 |

(Continued)

OTHER PUBLICATIONS

European Patent Office, International Search Report with Written Opinion, issued in PCT/EP2018/071724, dated Oct. 11, 2018, 13 pages, European Patent Office, Rijswijk, Netherlands.

(Continued)

*Primary Examiner* — Philip F Gabler
(74) *Attorney, Agent, or Firm* — Marshall & Melhorn, LLC

(57) ABSTRACT

A longitudinal adjuster for a vehicle seat may have a rail assembly having two rail pairs of seat rails. The respective rail pair has a fixed seat rail and a seat rail that is movable relative to the fixed seat rail. The rail assembly may also have a motor unit and a gearbox unit, which couples the motor unit and the movable seat rail. The rail assembly may also comprise a holder for receiving a gearbox housing of the gearbox unit. The holder is arranged with the gearbox unit in a hollow space formed by the one rail pair and is fixed to the movable seat rail. The holder is formed so as to be (Continued)

open at one end and closed at the opposite end. The holder has at least one stiffening element at the open end.

6 Claims, 12 Drawing Sheets

(51) Int. Cl.
  *B60N 2/02* (2006.01)
  *B60N 2/07* (2006.01)
(52) U.S. Cl.
  CPC .. *B60N 2002/0236* (2013.01); *B60N 2205/20* (2013.01)

(56) References Cited

U.S. PATENT DOCUMENTS

| | | | | |
|---|---|---|---|---|
| 6,688,667 | B2* | 2/2004 | Nishimoto | B60N 2/067 |
| | | | | 296/65.13 |
| 7,775,131 | B2* | 8/2010 | Becker | B60N 2/0232 |
| | | | | 74/606 R |
| 8,523,263 | B2* | 9/2013 | Kimura | B60N 2/067 |
| | | | | 296/65.13 |
| 9,145,068 | B2 | 9/2015 | Bosecker et al. | |
| 9,290,111 | B2* | 3/2016 | Enokijima | B60N 2/0722 |
| 9,511,685 | B2* | 12/2016 | Enokijima | B60N 2/0825 |
| 10,220,730 | B2* | 3/2019 | Nagata | B60N 2/0705 |

FOREIGN PATENT DOCUMENTS

| | | |
|---|---|---|
| CN | 102700438 A | 10/2012 |
| CN | 102791518 A | 11/2012 |
| CN | 104512283 A | 4/2015 |
| CN | 107000611 A | 8/2017 |
| DE | 2796013 A1 | 1/2001 |
| DE | 10139631 A1 | 3/2003 |
| DE | 2872747 A1 | 1/2006 |
| DE | 102010001847 A1 | 8/2011 |
| FR | 2796013 A1 | 1/2001 |
| JP | 2008222034 A | 9/2008 |

OTHER PUBLICATIONS

China National Intellectual Property Administration, Office Action issued in application No. 201880052118.5, dated Sep. 17, 2021, 7 pages.

The State Intellectual Property Office of People's Republic of China, Office Action in application No. 201880052118.5, dated Feb. 22, 2022, 8 pages.

* cited by examiner

LONGITUDINAL ADJUSTER FOR A VEHICLE SEAT

The invention relates to a longitudinal adjuster for a vehicle seat, in particular for a motor vehicle seat, and a vehicle seat.

There are known from the prior art longitudinal adjusters in which a gear mechanism is arranged in a gear housing and is coupled to a seat rail of the longitudinal adjuster.

An object of the present invention is to provide a longitudinal adjuster for a vehicle seat which is improved in comparison with the prior art and an improved vehicle seat. In particular, assembly of a gear mechanism from below in a rail profile should be enabled and disruptive noises during travel operation should be reduced or prevented.

With regard to the longitudinal adjuster, the object is achieved by the features set out in patent claim 1. With regard to the vehicle seat, the object is achieved by the features set out in patent claim 10.

The longitudinal adjuster according to the invention for a vehicle seat comprises a rail arrangement having two rail pairs of seat rails, wherein the respective rail pair has a first seat rail and a second seat rail, wherein the first seat rail is, for example, a fixed seat rail and the second seat rail is, for example, a seat rail which is movable, in particular displaceable, relative to the first or fixed seat rail. Furthermore, the longitudinal adjuster comprises a motor unit, a gear unit which couples the motor unit and the movable seat rail of one of the rail pairs to each other, and a retention member for receiving a gear housing of the gear unit. The retention member with the gear unit is arranged in a hollow space formed by one rail pair and is secured to the movable seat rail thereof and is constructed to be open at one end and closed at the opposite end, wherein the retention member has at least one reinforcement element at the open end.

This enables in a simple manner increased rigidity and reliable support so that longitudinal loads can be transmitted. In addition, the assembly is simplified, in particular assembly from below in the hollow space is enabled. In addition, disruptive noises during adjustment are substantially prevented.

One aspect makes provision for the retention member to be secured with the closed end to the movable seat rail of one rail pair.

In a possible embodiment, the reinforcement element is arranged in such a manner on the open end that an opening is formed for receiving the gear unit in the retention member.

Furthermore, the retention member and the reinforcement element may be preassembled to form a preliminary subassembly. Individual component tolerances can thereby be compensated for. For example, the reinforcement element is secured to the open end of the retention member. In this instance, the reinforcement element may be welded, adhesively bonded, riveted, screwed, soldered to the open end of the retention member or riveted, screwed, adhesively bonded or soldered thereto or securely connected in another suitable manner.

In a possible embodiment, the reinforcement element is constructed as at least one strut, in particular a tie bar or pressure strut, for example, as a wire, for example, a metal wire. In this instance, one or more struts may be provided and secured to the retention member.

In an alternative embodiment, the reinforcement element is constructed as a clamp, in particular a resilient clamp, for example, a spring steel plate.

For example, the retention member is constructed as a U-shaped profile. The U-shaped profile has two members, at the open end of which the at least one reinforcement element is arranged and connects the members.

Another aspect makes provision for a longitudinal adjuster for a vehicle seat, in particular for a motor vehicle seat, for motorized longitudinal adjustment of the vehicle seat, wherein the longitudinal adjuster comprises a rail arrangement having two rail pairs of seat rails, wherein the respective rail pair has a first seat rail and a second seat rail which can be displaced relative to the first seat rail. Furthermore, the longitudinal adjuster comprises a motor unit, a gear unit and a retention member for receiving a gear housing of the gear unit. The retention member is constructed to be open at one end and closed at the opposing end, wherein the retention member is secured with the closed end to one of the seat rails. At least one reinforcement element is arranged at the open end of the retention member. For example, there may be provided two struts, for example, tie bar or pressure struts which connect the open end of the retention member.

As a result of this structure, the retention member is improved with respect to a load stress. In particular, the rigidity is increased.

In a possible embodiment, the reinforcement element is constructed and arranged at the open end of the retention member in such a manner that an opening for receiving the gear unit in the retention member is formed. Simple assembly of the gear unit in the retention member is thereby possible. For example, the struts are placed far out at the open end of the retention member.

In another embodiment, the reinforcement element may be preassembled and be fitted as an assembly unit onto the retention member. For example, a plurality of struts are combined to form a frame and preassembled and form an assembly unit. It is thereby possible to compensate for individual component tolerances of the retention member before the reinforcement element is secured.

As a result of the improved rigidity of the retention member, at the vertical sides a gap between the retention member and gear unit can be complied with which prevents contact occurring during travel operation. Consequently, disruptive noises are reliably prevented.

The gear unit comprises at least one threaded spindle which is at least securely connected to the first seat rail of one of the pairs and a gear element which cooperates with the threaded spindle, for example, a worm wheel. Furthermore, the longitudinal adjuster comprises a transmission unit which is coupled to both the gear unit and the motor unit in order to transmit a rotational force of the motor unit to the threaded spindle and a gear housing which at least partially houses the gear unit and the retention member for receiving the gear housing. In this instance, the retention member is arranged with the gear housing in a hollow space formed between the first seat rail and the second seat rail of one rail pair and protrudes through a rail opening in the second rail therefrom at least partially in such a manner that the retention member closes the rail opening in the second rail.

In a possible embodiment, the retention member is constructed in such a manner that the gear housing is arranged between two retention legs of the retention member which are spaced apart from each other in the longitudinal direction and extend vertically. In this instance, the two retention legs are in particular coupled to the second seat rail, in particular connected thereto at least in a form-fitting or force-fitting manner.

In another embodiment, the retention member is constructed in a U-shaped manner, wherein a leg opening of the U-shaped retention member faces in the direction of the first seat rail and an intermediate space which is formed by the retention legs encloses the gear housing. Consequently, the gear housing is covered with respect to an upper side of the second seat rail, that is to say, the upper rail by means of a portion of the retention member that connects the two retention legs. For example, the U-shaped retention member is in the form of a curved element and/or a saddle bracket. Furthermore, each of the retention legs has a through-opening for the passage of the threaded spindle.

In a development of the invention, the free legs of the retention member which form the open end of the retention member are provided with the reinforcement element which connects these legs. As already described above, for example, there are provided a plurality of, in particular at least two, tie bar or pressure struts which connect the free legs to each other at the outer corners thereof.

The advantages achieved with the invention involve in particular the longitudinal adjuster being configurable in a compact manner to the greatest possible extent using the retention member according to the invention. In particular, a rail arrangement can thereby be constructed in a substantially flatter and more compact manner compared with conventional rail arrangements. For this purpose, for example, additional reinforcement and covering elements for fixing and protecting the gear housing are dispensed with. For example, the gear housing protrudes as a result of a required installation height (in a vertical direction) of the gear element (worm wheel) which is screwed on the threaded spindle from the upper side of the second seat rail.

In a development of the longitudinal adjuster, the U-shaped retention member is connected to the second seat rail at least in a form-fitting manner, force-fitting manner and/or with a material bond. An outer contour of the retention legs and the portion which connects the retention legs are in particular each adapted to a rail profile of the second seat rail, in particular a rail inner profile. Thereby, no additional securing elements, such as, for example, screws or rivets, are required to secure the retention members of the second rail, in particular an upper rail. Using such an outer contour of the retention member which corresponds to the rail inner contour/profile, it can be retained internally in the second rail in a form-fitting or force-fitting, for example, clamping or clip-fitted manner. Assembly time and material costs can thereby be reduced.

In a possible embodiment, the retention member is retained in the rail opening of the second rail in a force-fitting or form-fitting, in particular clamping or clip-fitted manner. To this end, for example, the retention legs are constructed in a flexible manner. For example, the retention legs are constructed in the form of resilient clamping arms, wherein, when the retention member is inserted with the retention legs facing in the rail opening, they are pressed inward counter to a resilient force. In the inserted state, the retention legs snap-fit independently outward in a resilient manner and clamp the retention member in the rail opening. That is to say: the retention member is, for example, retained in the clamping seat in the rail opening.

Additionally or alternatively, the retention member may be retained in recesses in side walls of the second rail in a force-fitting or form-fitting, in particular clamping or clip-fitted manner.

In this instance, the longitudinal adjuster may be constructed in such a manner that the second seat rail comprises a plurality of recesses. The upper side of the seat rail has at least one recess as the rail opening for receiving the connecting portion of the U-shaped retention member. As a result of the rail opening which is formed in the upper side, for example, a mechanical strength and durability of the second seat rail in the longitudinal and transverse direction are reduced.

As a result of the arrangement of the U-shaped retention member (also called curved retention member) which is transposed in particular with respect to the vertical axis with the closed portion, in the inserted state of the retention member, protruding upward from the second seat rail, the rail opening is simply closed and the gear housing is covered toward the outer side.

In this instance, the transposed U-shaped retention member can be arranged at least in a form-fitting or force-fitting manner in the rail opening of the second seat rail and acts as a reinforcement element of the second seat rail.

Furthermore, the housing region of the gear housing protruding from the upper side of the second seat rail is covered by the retention member and protected from external influences. Consequently, the U-shaped retention member is provided both for securing and positioning and for covering the gear housing and for reinforcing the second seat rail.

Furthermore, a space below the U-shaped retention member, in particular the space between the first seat rail (lower rail) and the retention member is increased. To this end, for example, the retention legs are spread outward and arranged at a predetermined leg angle with respect to each other. In particular, this increased space, as a result of the transposed arrangement of the U-shaped retention member, is directed and formed below the connection portion and inward into the rail inner space. It is thereby possible for additional components of the longitudinal adjuster to be arranged in the consequently newly formed internal assembly space.

For example, the retention member has a width (in the transverse direction) of 17.8 mm, a height (in a vertical direction) of 32 mm and a length (in the longitudinal direction) of 29.4 mm. For example, a spacing of an upper side of the gear housing with respect to a lower side of the retention member may be 1.7 mm. An overall weight of the structural unit comprising the retention member, the gear housing with the gear element is, for example, 66.9 g.

In a development, housing side portions of the gear housing may be constructed to be narrow to the greatest possible extent so that the gear housing has a width (in the transverse direction) in a range from 15 mm to 20 mm, for example, of 17 mm, a height (in a vertical direction) in a range from 20 mm to 30 mm, for example, 27 mm and a length (in the longitudinal direction) in a range from 20 mm to 26 mm, for example, of 24 mm. A weight of the gear housing with the gear element arranged inside the gear housing is, for example, in a range from 30 g to 38 g, for example 34 g.

Furthermore, the U-shaped retention member can be produced in a simple manner. For example, the U-shaped retention member can be produced by means of an injection-molding method or a pressing and/or folding method.

A possible embodiment of the longitudinal adjuster makes provision for the retention legs to comprise in each case at least a number of projections which are arranged on lateral edge regions, wherein a shape of the respective projections corresponds to a shape of lateral recesses of the second seat rail. In particular, the projections are each arranged in a lower side edge region of the retention legs. Furthermore, the projections are each constructed in a stepped manner. The retention member is retained, in particular secured, in the second seat rail at least in a force-fitting or form-fitting manner.

In a development, at least the projections are constructed in a flexible manner, for example, formed from a plastics material, wherein the projections are retained for form-fitting or force-fitting connection in the corresponding recesses, in particular retained in a clamping, engaging or snap-fitting manner. In another embodiment, the projections are, for example, constructed in a stepped manner. This enables pre-engagement of the components of the longitudinal adjuster when the longitudinal adjuster is assembled, for example, for an orientation of the components and a main engagement in the assembled state of the components of the longitudinal adjuster, and consequently enables them to be fixed to each other.

In another embodiment, the gear housing is connected at least to the retention legs of the U-shaped retention member. The gear housing is thereby supported by the retention legs in particular during a longitudinal displacement which is carried out by the second seat rail.

In addition, the rail opening may when viewed in the longitudinal direction have at opposing opening sides a stop element for the outwardly spread retention legs. Alternatively or additionally, each retention leg may have at the leg outer side thereof an outwardly facing locking projection which, for example, engages in a locking manner in the associated stop element.

In a development, a vehicle seat is provided with the above-described longitudinal adjuster for motorized longitudinal adjustment of the vehicle seat.

Embodiments of the invention are explained in greater detail with reference to drawings.

IN THE DRAWINGS

FIG. 1A is a schematic side view of a vehicle seat having a longitudinal adjuster, FIG. 1B is a schematic, perspective view of a rail arrangement for a longitudinal adjuster, FIGS. 2A and 2B are a schematic side view and a sectioned illustration of an embodiment of the longitudinal adjuster, respectively, FIG. 2C is a schematic plan view of an end side of one of the rails, FIGS. 3A and 3B are a schematic sectioned illustration of a longitudinal adjuster without or with a gear unit mounted in the retention member, FIGS. 4A to 4D are different schematic illustrations of a retention member for a gear unit, FIGS. 5A to 5D are different schematic illustrations of a retention member for a gear unit with a view of an open end of the retention member, and FIGS. 6A to 6D are different schematic, perspective illustrations of a retention member which is arranged in a rail, FIGS. 7A to 7C are different schematic illustrations of an alternative embodiment of a reinforcement element for a retention member of a gear unit of a longitudinal adjuster, FIGS. 8A to 8D are different schematic, perspective illustrations of a retention member with the alternative reinforcement element, and FIGS. 9A and 9B are a schematic plan view of the transverse side of the retention member with the alternative reinforcement element.

Mutually corresponding components have been given the same reference numerals in all the Figures.

An arrangement of the vehicle seat 1 in the vehicle is defined by means of the coordinate system used below, comprising a vertical axis z which is associated with a vertical direction of the vehicle, a longitudinal axis x which is associated with a longitudinal direction of the vehicle and a transverse axis y which is associated with a transverse direction of the vehicle.

The vehicle seat 1 comprises, for example, a seat face 1.1 and a backrest 1.2 which is arranged on the seat face 1.1.

Figure 1A:
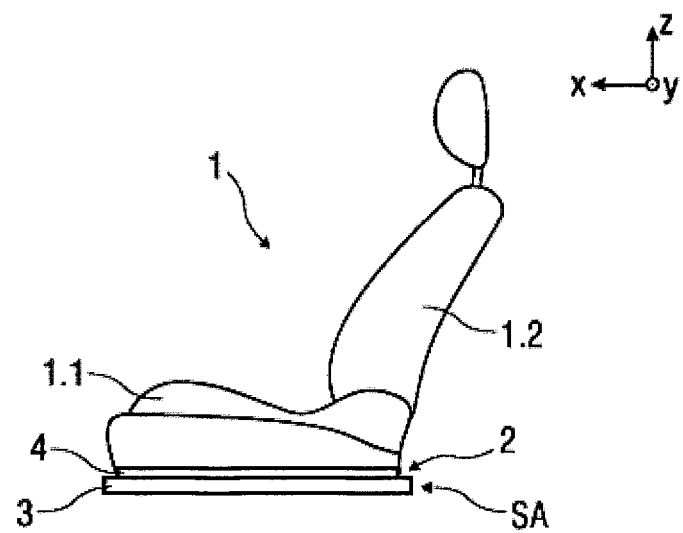
FIG. 1A is a side view of a possible embodiment of a vehicle seat 1, comprising at least one longitudinal adjuster 2 having a rail arrangement SA.
Figure 1B:
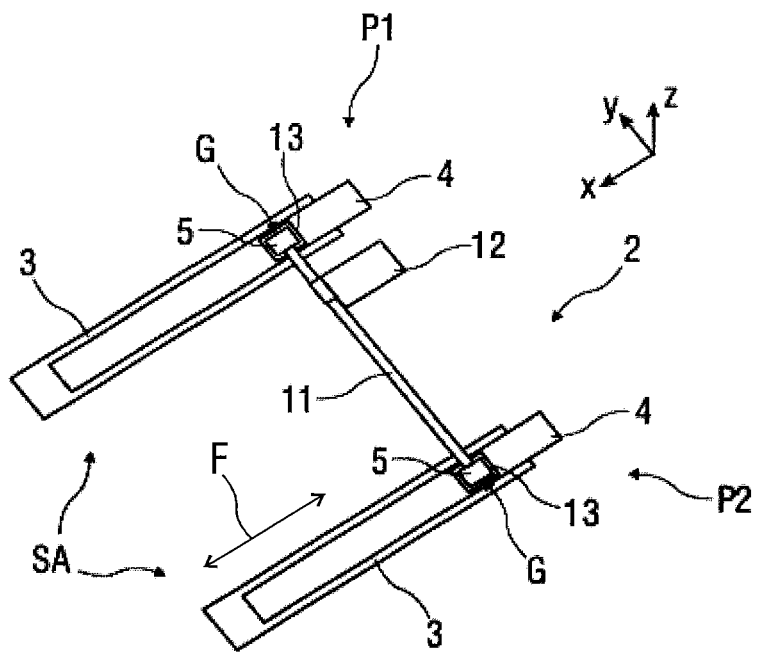
FIG. 1B is a perspective view of a possible embodiment of the longitudinal adjuster 2 with the rail arrangement SA.

The longitudinal adjuster 2 is provided for longitudinal displaceability of the vehicle seat 1 and comprises, as illustrated in FIG. 1B, two rail pairs P1, P2 of seat rails 3, 4.

In this instance, the respective rail pair P1 or P2 has a first lower seat rail 3 and a second upper seat rail 4 which is displaceable in the longitudinal direction relative to the lower seat rail 3. In the embodiment illustrated, the upper seat rail 4 is arranged and secured on the seat face 1.1.

In this instance, the lower seat rail 3 is arranged and secured in a manner secured to the vehicle on a vehicle structure, for example, on a vehicle floor.

In particular, the first, lower and fixed seat rail 3 and the second, upper and movable, in particular longitudinally movable seat rail 4 form an individual rail pair P1, P2, wherein, for example, at each side of the vehicle seat 1, a rail pair P1 or P2 is arranged.

The longitudinal adjuster 2 comprises a gear unit G, which is connected, in particular releasably connected, at least to the second, in particular movable seat rail 4 of at least one of the rail pairs P1, P2. In the embodiment shown, both rail pairs P1, P2 have a gear unit G.

Both rail pairs P1, P2 are connected to each other by means of a transmission unit 11. For motorized longitudinal adjustment of the vehicle seat 1, there is provided a motor unit 12 which is coupled to the transmission unit 11.

The longitudinal adjuster 2 consequently comprises at least the motor unit 12, the gear unit G which couples the motor unit 12 and the second, movable seat rail 4 of at least one of the rail pairs P1 to each other and a retention member 5 for receiving a gear housing 9 of the gear unit G. In this instance, the retention member 5 with the gear unit G is arranged in a hollow space BR formed by one rail pair P1 and secured to the movable seat rail 4 thereof and constructed to be open at one end 5.7 and to be closed at the opposing end, wherein the retention member 5 has at the open end 5.7 at least one reinforcement element 5.6, as will be described below in greater detail by various embodiments in FIGS. 2A to 9B.

The drive of the longitudinal adjuster 2 is, for example, constructed as a spindle drive and comprises, for example, an electric motor as a motor unit 12 and the gear unit G, by means of which a rotational movement of the electric motor is transmitted to a threaded spindle 6. As a result of the spindle drive, it is made possible to convert a rotational movement of the electrical motor via the gear unit G into a translational movement of the threaded spindle 6.

Figure 2A:
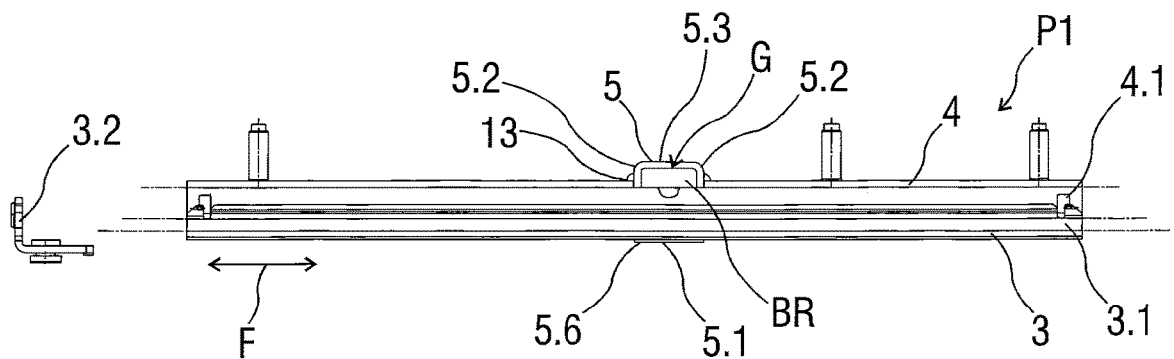
Figure 2B:
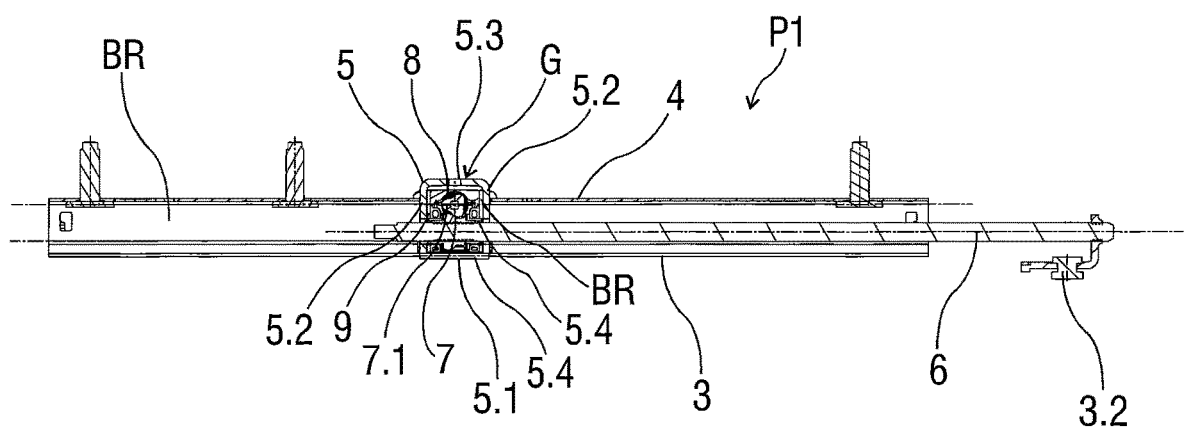

FIGS. 2A and 2B show a side view or a sectioned illustration of one of the rail pairs P1, P2 of the longitudinal adjuster 2, comprising the lower seat rail 3, the upper seat rail 4 and the gear unit G.

The retention member 5 is in this instance arranged together with the gear housing 9 which is received and retained in the retention member 5 in a hollow space BR (also referred to as the structural space) which is formed between the first lower seat rail 3 and the second upper seat rail 4. Furthermore, the retention member 5 protrudes at least partially from the upper rail through a rail opening 13 in the upper rail 4. In this instance, the retention member 5 closes this rail opening 13 and consequently covers both the rail inner space below and the gear housing 9.

The lower seat rail 3 and the upper seat rail 4 engage around each other with their substantially U-shaped profiles with inwardly or outwardly bent rail side walls 3.1, 4.1. Consequently, a closed rail profile is formed.

Furthermore, the longitudinal adjuster 2 comprises inside the structural space or hollow space BR defined by the rail profile the threaded spindle 6 which is securely connected to the lower seat rail 3 and which extends in the longitudinal direction (x axis).

In order to retain the threaded spindle 6, there is provided, for example, a retention element 3.2 which is fixed at the rail side or bodywork side and in which the threaded spindle 6 is inserted and retained in a form-fitting and/or force-fitting manner.

In particular, the retention element 3.2 is arranged in an end region of the lower seat rail 3 formed in the longitudinal direction or outside one of the ends of the lower seat rail 3. In this instance, the at least one retention element 3.2 may, for example, be constructed as a profile element, in particular an L-profile or as a blocking element which fixes the threaded spindle 6 in position. The retention element 3.2 is, for example, constructed as an L-shaped flap having a through-opening for the passage and retention of the threaded spindle 6.

The threaded spindle 6 extends in this instance substantially over the length of the lower seat rail 3.

For example, the threaded spindle 6 has at least a length in a range from 280 mm to 330 mm, in particular of 320 mm, wherein a travel path F of the gear unit G and consequently of the vehicle seat 1 has a maximum length in a range from 240 mm to 280 mm, for example, of at least 260 mm.

Furthermore, the longitudinal adjuster 2 comprises as a gear unit G a rotatable gear element 7 which cooperates with the threaded spindle 6 for longitudinal adjustment.

The gear element 7 comprises a spindle nut 7.1 which is rotatably arranged on the threaded spindle 6. The spindle nut 7.1 has an outer tooth arrangement in which a drive element 8 which is arranged perpendicularly to the threaded spindle 6 engages.

In the embodiment illustrated, the longitudinal adjuster 2 comprises, for example, as a drive element 8 which is connected to the gear element 7 a worm wheel (also referred to as a drive worm) 8.1 which is in meshing engagement with the gear element 7. Furthermore, the drive element 8 is operatively connected, for example, via the transmission unit 11 to the electric motor unit 12 (also referred to as a drive motor) of the longitudinal adjuster 2.

In the second, upper seat rail 4, the gear housing 9 is provided for receiving the gear element 7 and drive element 8. In particular, the gear housing 9 is constructed to support and retain the gear element 7 and the drive element 8 in the structural space BR defined by the rail profile with the highest possible level of rigidity and strength.

The gear housing 9 comprises a number of housing portions. For example, the gear housing 9 comprises two housing side portions and a housing upper portion and a housing lower portion. The housing portions are, for example, connected to each other with a material bond, in a form-fitting and/or force-fitting manner. For example, the housing portions are inserted one into the other, in particular connected to each other in a locking manner. Alternatively or additionally, they can be screwed, riveted or welded to each other.

In order to cover the drive element 8 which is arranged above the gear element 7, the gear housing 9 comprises the housing upper portion, which is connected to at least one of the lateral housing side portions with a material bond, in a form-fitting and/or force-fitting manner.

In the embodiment illustrated, a gear housing portion protrudes through the rail opening 13 formed in an upper side of the second, upper seat rail 4.

In order to retain and reinforce the gear housing 9, the longitudinal adjuster 2 comprises the retention member 5.

The retention member 5 is arranged in the second, upper seat rail 4 and connected thereto. For example, the retention member 5 is constructed in a U-shaped manner, in particular as a U-shaped curved retention member. The retention member 5 comprises in this instance two retention legs 5.2 which are connected at one leg end by means of a portion 5.3 which connects the ends of the retention legs 5.2. At the opposing ends of the retention legs 5.2, the retention member 5 has a leg opening 5.1. In the inserted and assembled state of the gear unit G, the leg opening 5.1 is orientated in the direction of the first, lower seat rail 3.

Furthermore, the retention member 5 has in a longitudinal direction (x axis) the mutually spaced-apart retention legs 5.2 which are connected to the second seat rail 4 and which are vertically formed. The retention legs 5.2 are connected to each other by means of the substantially horizontally formed portion 5.3. Additionally, the retention legs 5.2 are connected at the open end of the retention member 5 and therefore at the leg opening 5.1 by means of at least one reinforcement element 5.6.

Furthermore, the retention legs 5.2 may be connected to the respective corresponding housing side portion with a material bond, in a force-fitting and/or form-fitting manner. In particular the retention legs 5.2 are in each case welded to the corresponding housing portions.

Furthermore, each retention leg 5.2 of the U-shaped retention member 5 is connected to the second seat rail 4. To this end, each retention leg 5.2 comprises at least one coupling element by means of which the retention leg 5.2 is retained on the second seat rail 4.

Furthermore, the respective retention leg 5.2 is connected at, for example, three surfaces (upper side and side members) to the second seat rail 4. In particular, the retention member 5 is connected to the second seat rail 4 at mutually corresponding locations in a form-fitting manner, for example, locking manner, force-fitting manner, for example, in a resiliently clamped manner, or with a material bond, for example, in a welded manner.

Furthermore, each of the retention legs 5.2 has a through-opening 5.4 for the passage of the threaded spindle 6. Furthermore, the housing upper portion is spaced apart with respect to an inner wall of the portion 5.3 of the retention member 5. The spacing A is located in a range of a few millimeters, in particular in a range from 1 mm to 3 mm, for example, of 1.5 mm.

As a result of the illustrated arrangement of the U-shaped retention member 5, the L-shaped retention element 3.2 can be arranged so as to use the structural space in the longitudinal adjuster 2 or in the region thereof. A lower securing side of the L-shaped retention element 3.2 is arranged below the threaded spindle 6 and parallel therewith and in particular in the direction of the threaded spindle 6 and may be orientated so as to protrude into the structural space BR. The retention element 3.2 is constructed in such a manner that it forms an end stop for the retention member 5 during a longitudinal adjustment operation.

Figure 2C:
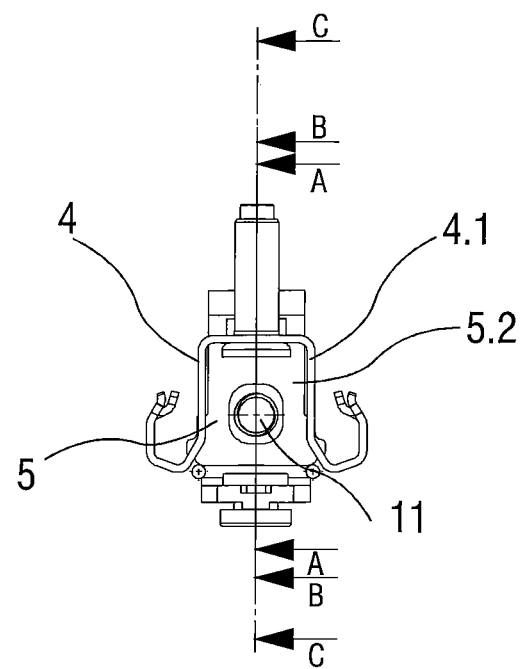

FIG. 2C is a plan view of an end side of the rail 4.

Figure 3A:
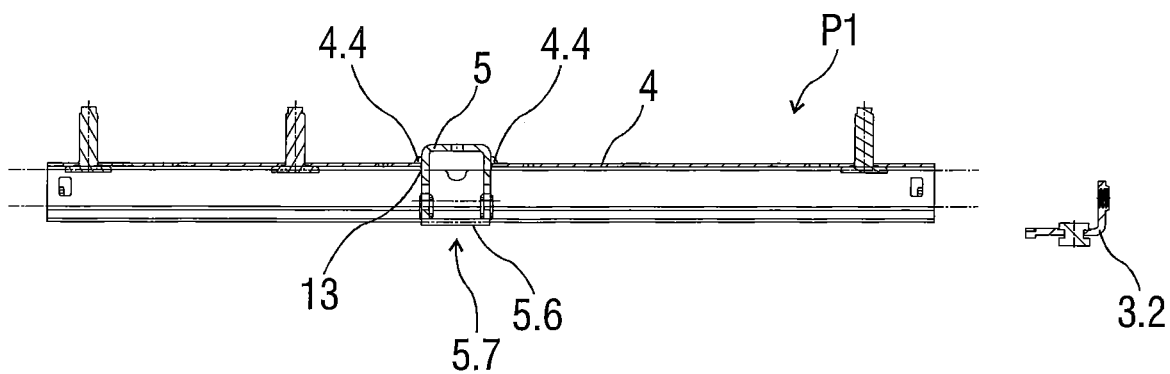
Figure 3B:
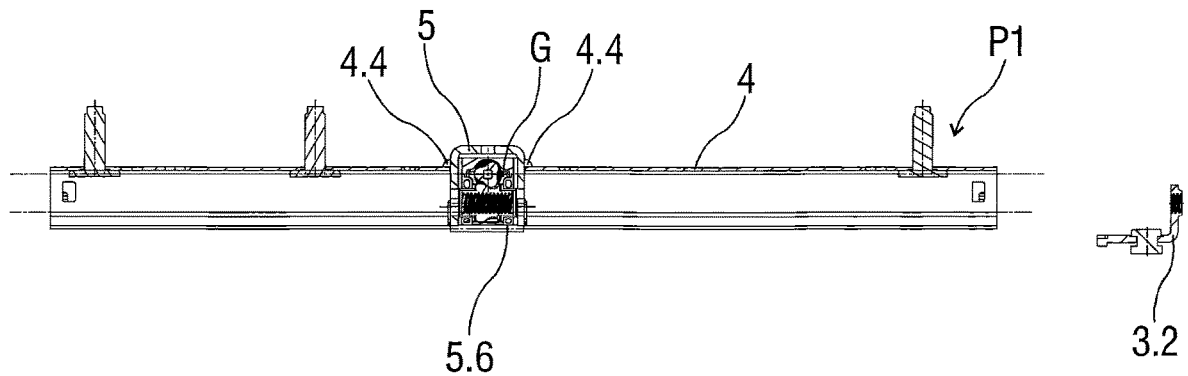

FIGS. 3A and 3B each show a sectioned illustration of the upper rail 4 with the installed retention member 5 without a mounted gear unit G or with a mounted gear unit G. When the longitudinal adjuster 2 is mounted, the retention member 5 is initially mounted in the rail 4. Subsequently, the gear unit G is inserted into the retention member 5 and fixed from the open end 5.7 of the retention member 5. The retention member 5 is in particular fixed in the rail 4 in a form-fitting and/or force-fitting manner. Alternatively or additionally, the retention member 5 may be connected to the rail 4 with a material bond, in particular by means of a welded connection.

In the region of the rail opening 13, there may be provided stops 4.4 which protrude from the rail upper side and which laterally support the retention member 5 which protrudes from the rail 4.

Figure 4A:
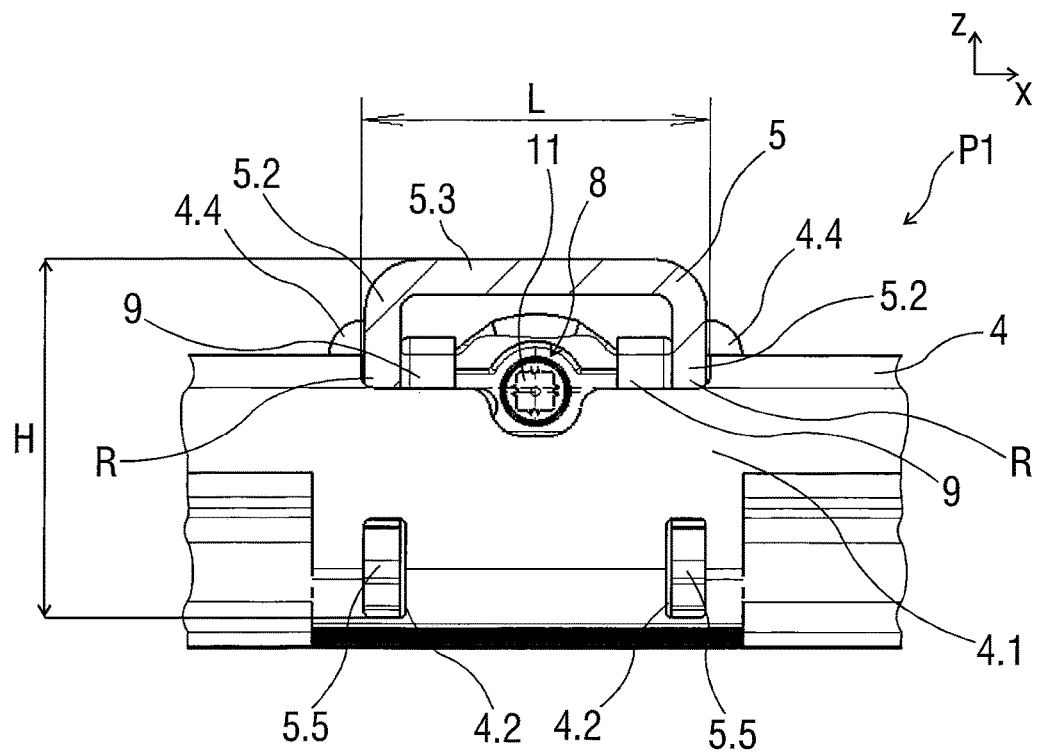

FIG. 4A is an enlarged illustration of one of the rail pairs P1 in the region of the rail opening 13 with the mounted retention member 5 and gear unit G.

The retention member 5 is constructed as a profile element, in particular as a U-shaped curved retention member. The retention member 5 comprises two retention legs 5.2 which are connected to each other by means of the portion 5.3. The retention member 5 is constructed in an integral manner and is, for example, a molded component. At the free ends of the retention legs 5.2, projections 5.5 protrude outward.

In the illustrated embodiment, each retention leg 5.2 comprises at each lateral edge region R a projection 5.5. A shape of the respective projections 5.5 corresponds to lateral recesses 4.2 of the second seat rail 4. In this instance, the projections 5.5 are configured to engage in the recesses 4.2 in a form-fitting and/or force-fitting manner. In particular, the projections 5.5 engage in the recesses 4.2

In the illustrated embodiment, the projections 5.5 are in each case arranged in a lower region of the retention legs 5.2. Furthermore, the projections 5.5 are in each case constructed in a stepped manner and protrude perpendicularly from the respective lateral edge region R.

For example, the retention member 5 has a predetermined width B (in the transverse direction), a predetermined height H (in a vertical direction) and a predetermined length L (width, extent of the retention member 5 in the longitudinal direction). An overall weight of the gear unit G formed by the retention member 5, the gear housing 9 with the gear element 7 and the drive element 8 is particularly light and is in a range from 55 g to 100 g, in particular from 60 g to 70 g, and is, for example, 67 g.

Figure 4B:
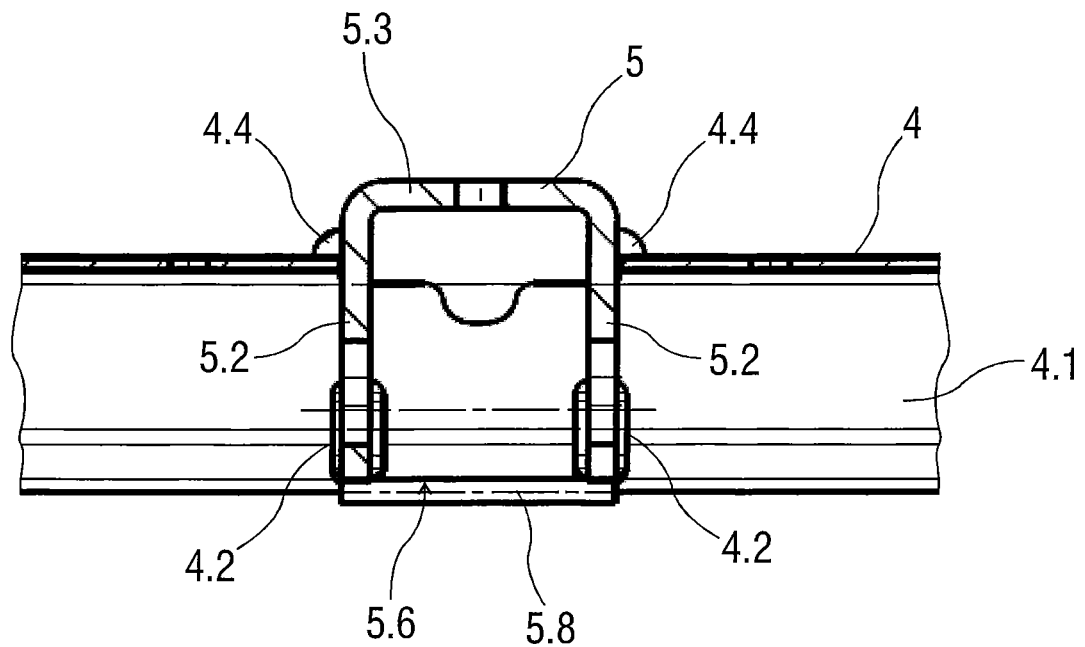

FIG. 4B shows FIG. 4A as a cross-section without the gear unit G being mounted. The reinforcement element 5.6 is in this instance arranged at the open end 5.7 of the retention member 5 in such a manner that it connects the free ends of the retention legs 5.2. For example, the reinforcement element 5.6 is constructed as a strut 5.8, in particular as a tie bar or a pressure strut, for example, as a metal wire or a metal rod.

Figure 4C:
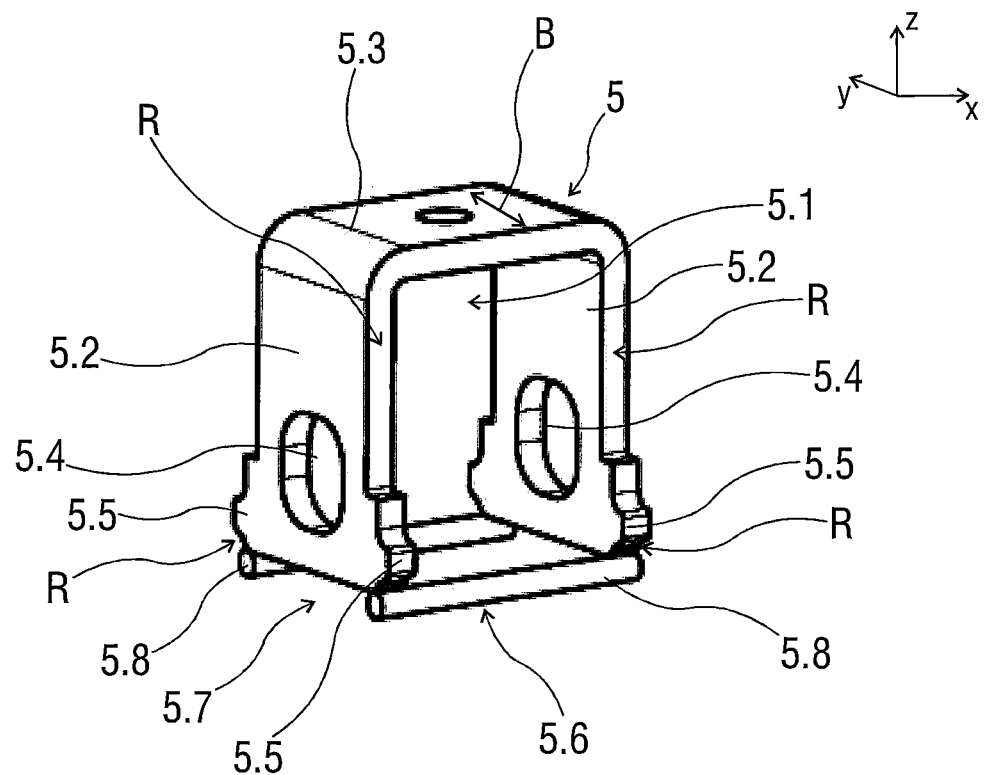

FIG. 4C is a perspective illustration of an embodiment of a retention member 5 with two struts 5.8 at the open end 5.7 and the four outwardly projecting projections 5.5.

The reinforcement element 5.6 is constructed in such a manner and arranged at the open end 5.7 of the retention member 5 that an opening is formed for receiving the gear unit G in the retention member 5. A simple assembly of the gear unit G in the retention member 5 is thereby possible in spite of the additional reinforcement element 5.6.

In order to form this assembly opening, the struts 5.8 are placed on the open end 5.7 of the retention member 5, for example, on the outer corners of the free ends of each retention leg 5.2 and secured at that location, for example, adhesively bonded or welded.

Figure 4D:
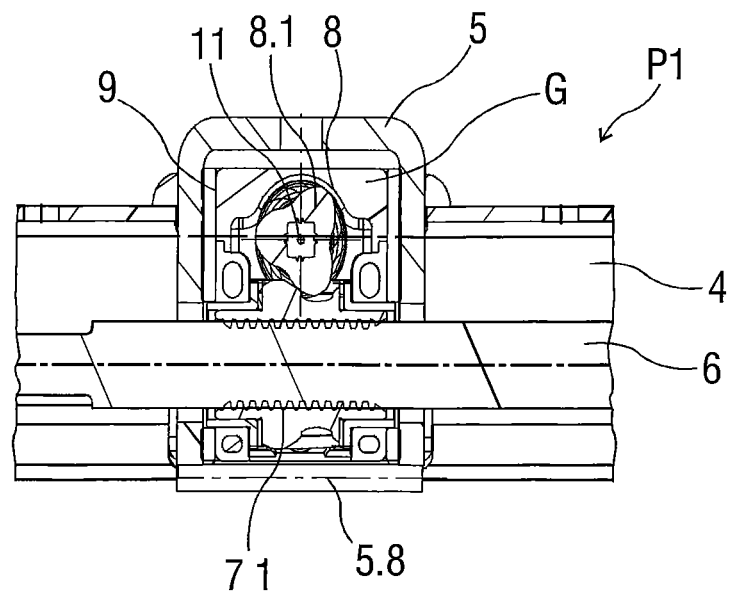

FIG. 4D shows the retention member 5 with a mounted gear unit G and mounted threaded spindle 6 in the assembled state, in which the retention member 5 is fixed in the rail opening 13.

The spindle nut 7.1 is arranged so as to be longitudinally movable on the threaded spindle 6. The drive element 8 comprises a worm wheel 8.1 which engages in the spindle nut 7.1 and during operation rotates it so that, as a result of the corresponding inner thread on the threaded spindle 6, it moves along the longitudinal orientation of the threaded spindle 6 and enables a longitudinal adjustment of the rail 4 relative to the rail 3.

FIGS. 5A to 5D show different views of the open end 5.7 of the retention member 5 which is mounted in the rail 4 with or without a gear unit G in order to better illustrate the reinforcement element 5.6.

Figure 5A:
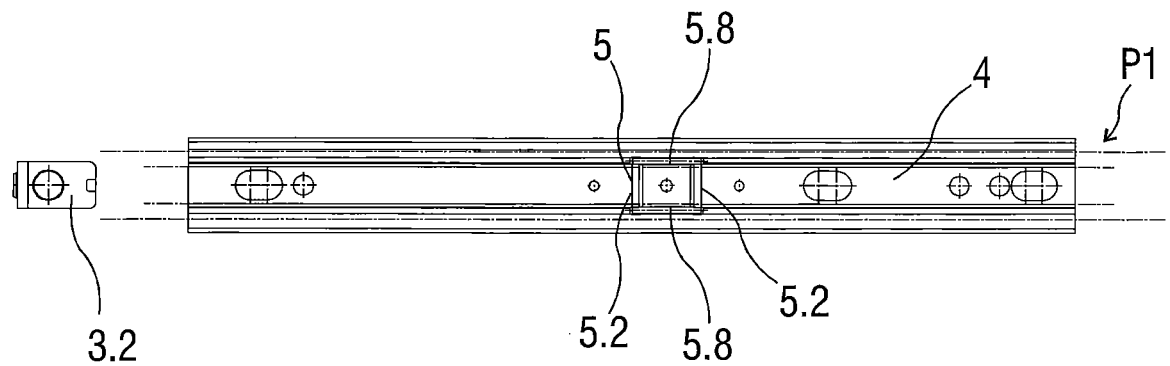
Figure 5B:
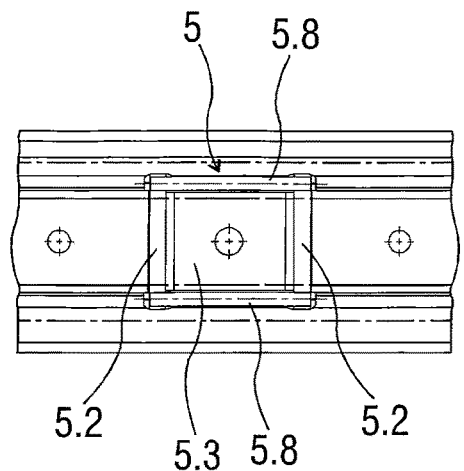

FIGS. 5A and 5B show the preassembled struts 5.8 which are arranged on the outer corners of the retention legs 5.2. The gear unit G is not yet mounted in the retention member 5. In this instance, a strut 5.8 connects in each case the opposing mutually parallel outer corners of the retention legs 5.2.

In another embodiment, the reinforcement element 5.6 is preassembled and may form an assembly unit. For example, a plurality of struts 5.8 can be assembled to form a frame and be arranged as a reinforcement frame on the free ends of the retention legs 5.2 and fixed thereto.

Figure 5C:
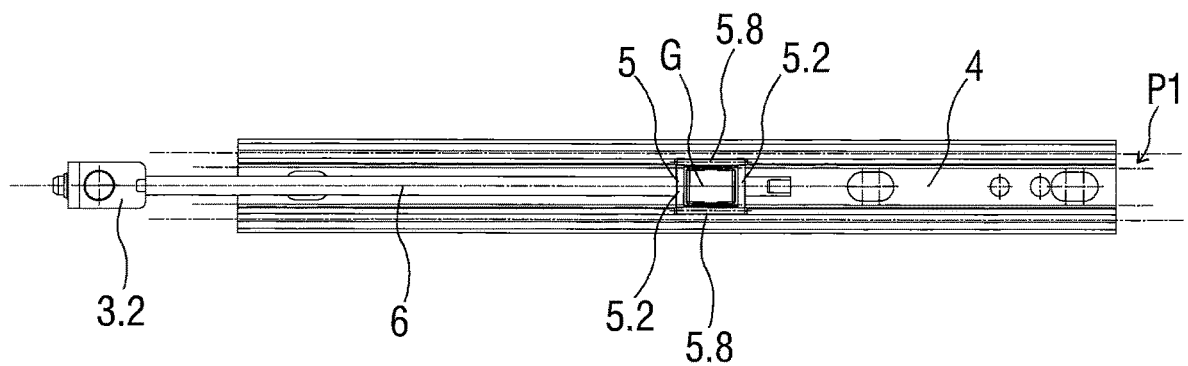
Figure 5D:
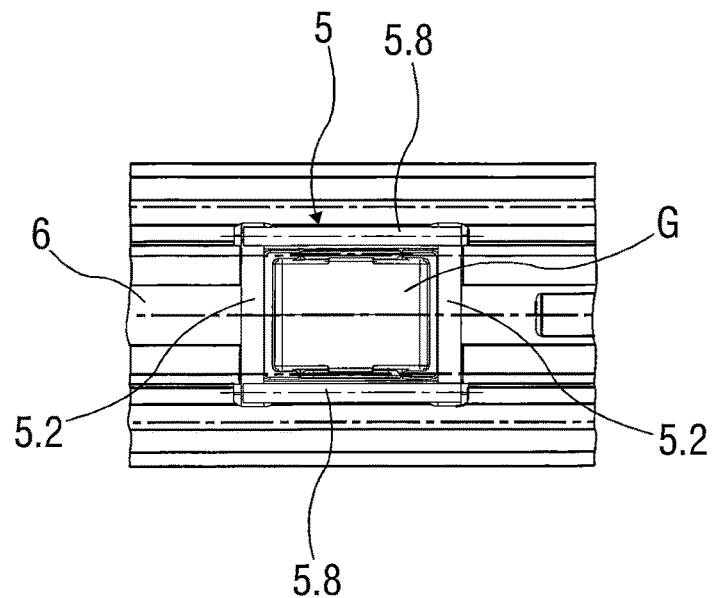

FIGS. 5C and 5D show the retention member 5 in the same view as in FIGS. 5A and 5B, but with a mounted gear unit G and mounted threaded spindle 6. After assembly of the retention member 5 in the rail 4, the gear unit G is introduced as an assembly module in the retention member 5, from the open end 5.7 and fixed in the retention member 5.

Figure 6A:
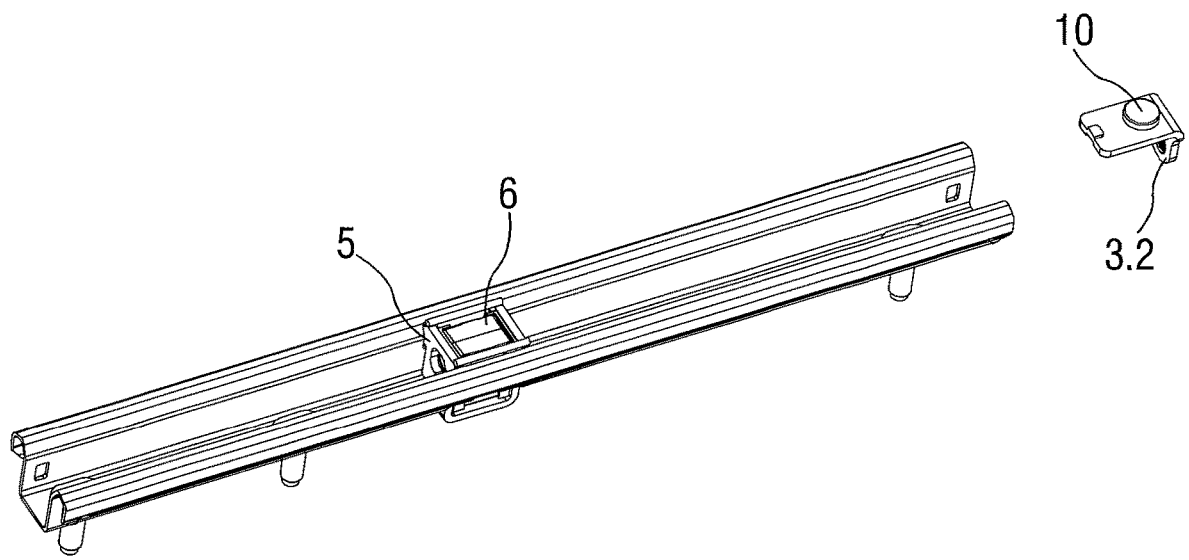
Figure 6B:
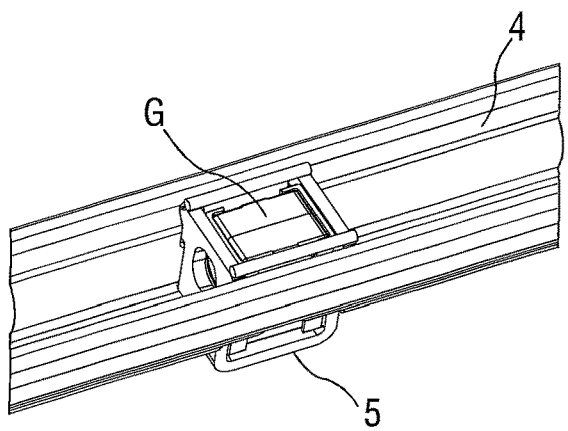

FIGS. 6A and 6B show the retention member 5 with a mounted gear unit G.

Figure 6C:
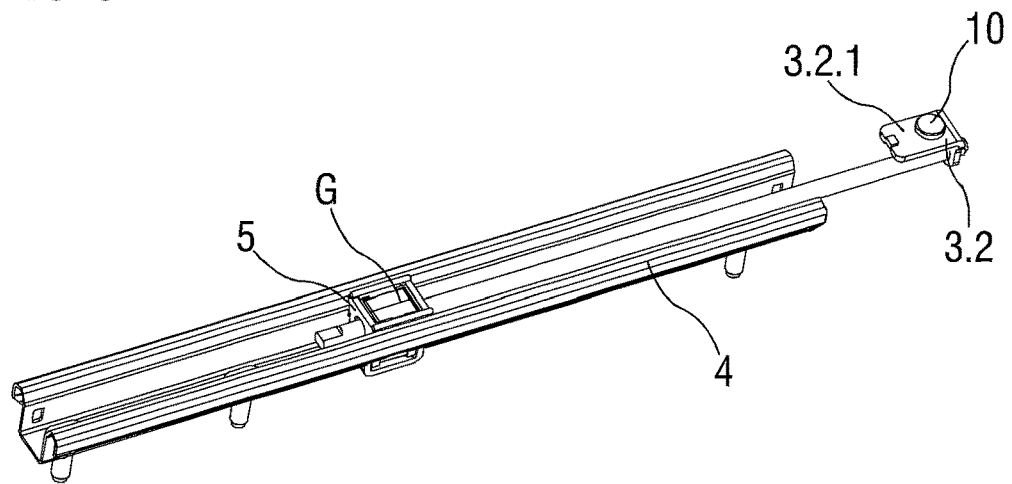
Figure 6D:
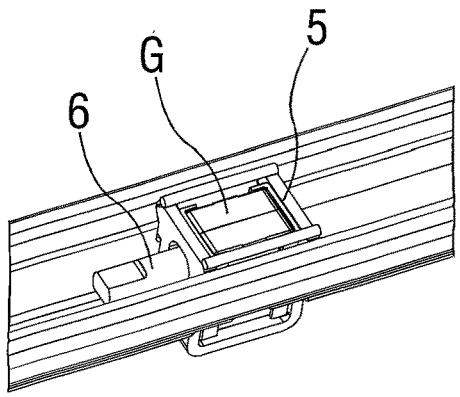

FIGS. 6C and 6D show the subsequent assembly of the threaded spindle 6 in the gear unit G.

Furthermore, under the threaded spindle 6 and below the retention member 5, sufficient structural space BR may be provided for receiving a securing pin 10 of the retention element 3.2 in the event of a longitudinal adjustment of the upper seat rail 4.

The threaded spindle 6 is secured to the L-shaped retention element 3.2 with an inwardly directed securing side 3.2.1. The inwardly directed securing side 3.2.1 is intended in particular to be understood to refer to the orientation of the securing side 3.2.1 inward into the structural space BR of the relevant rail pair P1 or P2.

The gear housing 9 is constructed in several parts and may comprise a plurality of housing portions, for example, housing shells or plates. The housing portions are connected to each other in a form-fitting, force-fitting manner or with a material bond. To this end, they are in particular partially in abutment with each other, for example, with the edges or borders thereof. In this instance, the housing portions are, for example, clamped, locked, plug-fitted, screwed, welded or adhesively bonded to each other.

The gear housing 9 has in particular dimensions which are adapted to the retention member 5 and/or an adapted shape or vice versa.

For example, the gear housing 9 has a predetermined width B (in a transverse direction), a predetermined height H (in a vertical direction) and a predetermined length L. A weight of the gear housing 9 with the gear element 7 which is arranged inside the gear housing 9 and the drive element 8 is, for example, in a range from 25 g to 50 g.

In all embodiments, the retention member 5 is secured with the closed end to the movable seat rail 4 of one rail pair P1, for example, welded, clip-fitted, soldered, adhesively bonded or plug-fitted.

In another embodiment, the retention member 5 and the reinforcement element(s) 5.6 may be preassembled to form a preliminary subassembly. The preliminary subassembly is then mounted as a structural unit from below into the upper, movable seat rail 4.

In this instance, the gear unit G may be mounted in the retention member 5 prior to an assembly of the reinforcement element(s). Alternatively, the reinforcement element(s) 5.6 may be arranged in such a manner at the open end 5.7 of the retention member 5 that an opening for receiving the gear unit G is formed in the retention member 5.

Figure 7A:
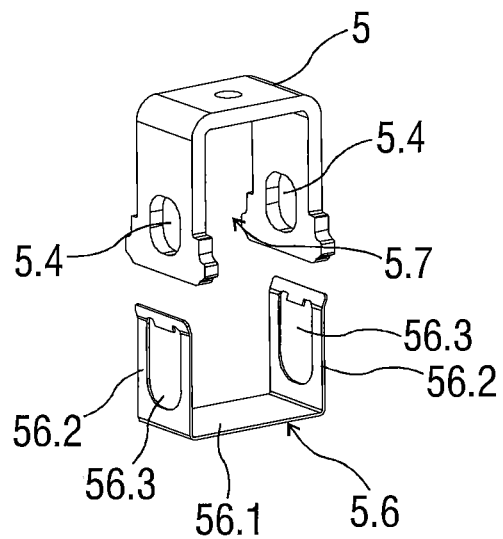
Figure 7B:
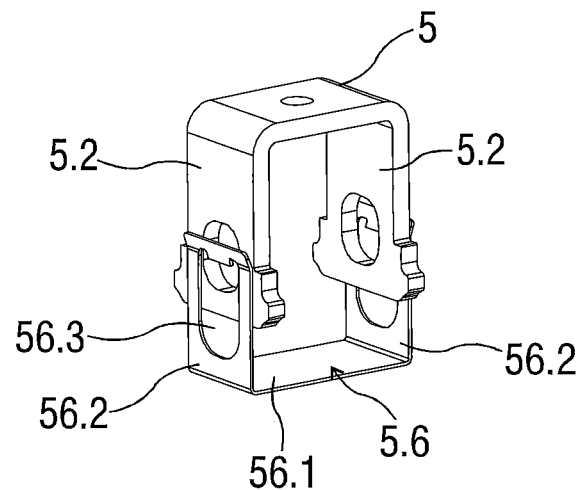
Figure 7C:
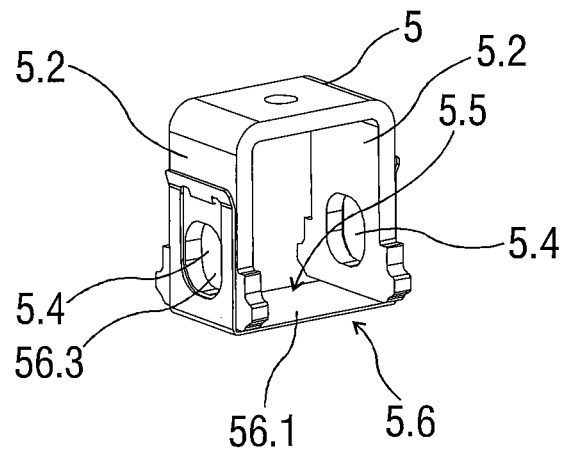

FIGS. 7A to 7C schematically show different illustrations of an alternative embodiment of a reinforcement element 5.6 for the retention member 5 of the gear unit G of the longitudinal adjuster 2.

In place of the struts 5.8 of the first embodiment, the reinforcement element 5.6 is constructed as a clamp 56.1, in particular a resilient clamp, for example, a spring steel plate. The clamp 56.1 is a profile element and is constructed, for example, as a U-shaped profile. The clamp 56.1 has to this end clamp legs 56.2. The clamp 56.1 is, for example, a spring steel plate which is bent in a U-shaped manner.

The clamp 56.1 is placed on the open end 5.7 of the retention member 5 (FIG. 7A). In this instance, the clamp legs 56.2 overlap the retention legs 5.2 of the retention member 5 (FIG. 7B).

The clamp legs 56.2 each have an opening 56.3. These openings 56.3 are in the state placed completely on the retention member 5 arranged in alignment with the through-openings 5.4 in the retention legs 5.2 of the retention member 5 (FIG. 7C).

FIGS. 8A to 8D are different schematic, perspective illustrations of the retention member 5 with the alternative reinforcement element 5.6 which is constructed as a clamp 56.1.

Figure 8A:
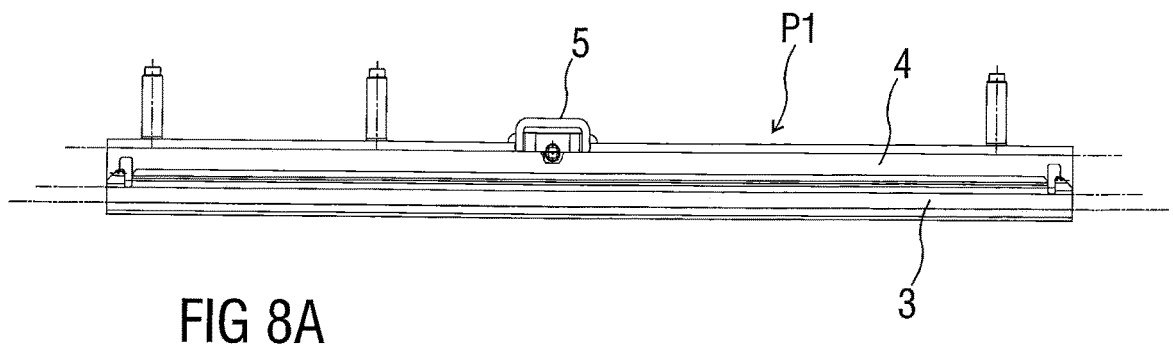

FIG. 8A shows the gear unit G in the completely inserted state in the hollow space BR of the rail pair P1.

Figure 8B:
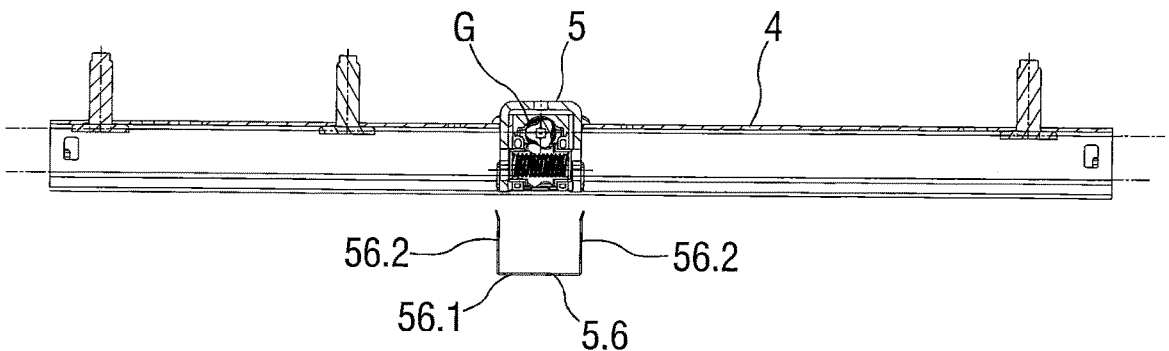
Figure 8C:
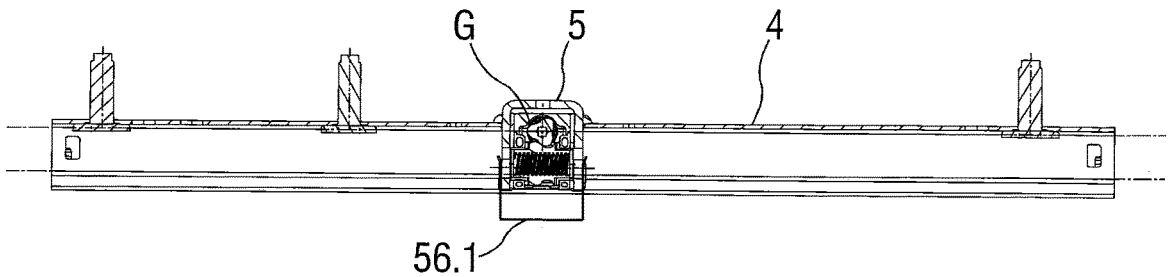
Figure 8D:
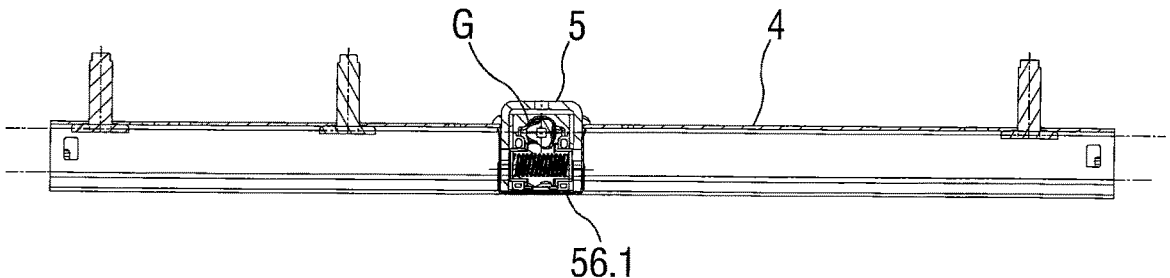

FIGS. 8B to 8D show only the movable, upper seat rail 4 with the retention member 5 arranged therein with the gear unit G which has already been described above in relation to FIGS. 1A to 6D. In FIG. 8B, initially only the retention member 5 is arranged and secured with the gear unit G on the movable, upper seat rail 4.

The clamp-like reinforcement element 5.6 is placed with the free ends of the clamp legs 56.2 on the retention member 5, as shown in FIG. 8B.

FIG. 8C shows the partially placed clamp 56.1, by analogy with FIG. 7B.

In FIG. 8D, the clamp 56.1 is placed completely on the retention member 5 so that the openings 56.3 of the clamp 56.1 are located in alignment with the through-openings 5.4 of the retention member 5 so that the threaded spindle 6 can pass through.

Figure 9A:
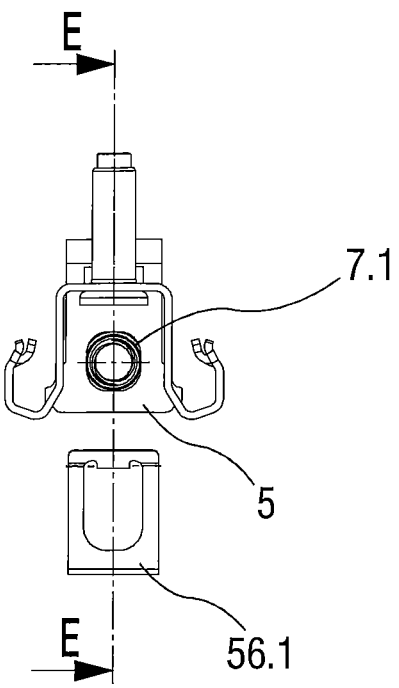
Figure 9B:
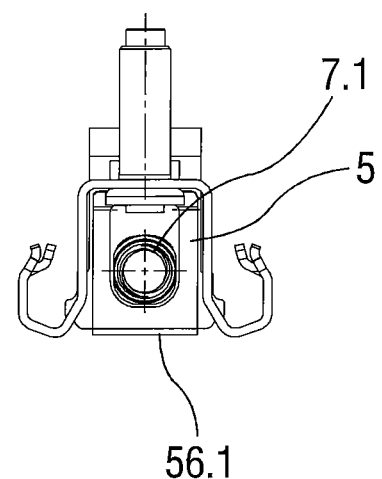

FIGS. 9A and 9B are a schematic plan view of the transverse side of the retention member 5 with the clamp 56.1 prior to assembly on the retention member 5 or after assembly.

LIST OF REFERENCE NUMERALS

1 Vehicle seat
1.1 Seat face
1.2 Backrest
2 Longitudinal adjuster
3, 4 Seat rail
3.1, 4.1 Rail side wall
3.2 Retention element
3.2.1 Securing side
4.2 Recess
4.4 Stop
5 Retention member
5.1 Leg opening
5.2 Retention leg
5.3 Portion
5.4 Through-opening
5.5 Projection
5.6 Reinforcement element
5.7 Open end
5.8 Strut
56.1 Clamp
56.2 Clamp leg
56.3 Opening
6 Threaded spindle
7 Gear element
7.1 Spindle nut
8 Drive element
8.1 Worm wheel
9 Gear housing
10 Securing pin
11 Transmission unit
12 Motor unit
13 Rail opening
x, y, z Axis
A Spacing
B Width
BR Hollow space/Structural space
F Travel path
G Gear unit
H Height
L Length
P1, P2 Rail pairs
R Edge region
SA Rail arrangement

The invention claimed is:

1. A longitudinal adjuster for a vehicle seat, comprising:
a rail arrangement having two rail pairs of seat rails, wherein the respective rail pair has a fixed seat rail and a seat rail which is movable relative to the fixed seat rail,
a motor unit,
a gear unit which couples the motor unit and the movable seat rail of at least one of the rail pairs to each other, and
a retention member for receiving a gear housing of the gear unit,
wherein the retention member is arranged with the gear unit in a hollow space formed by one rail pair and is secured to the movable seat rail thereof, and is constructed to be open at one end and closed at the opposite end, and wherein the retention member is constructed as a U-shaped profile,
wherein the U-shaped profile has two planar retention legs, wherein the planar retention legs are equally spaced apart by a planar connector such that the planar retention legs extend transverse the connector, and
wherein a U-shaped reinforcement element comprised of a planar base section connecting two planar and equally spaced apart clamp legs generally extending transverse the base section is adapted to at least partially and selectively nest about the retention legs, wherein outside surfaces of both clamp legs are located adjacent and generally parallel outside surfaces of the retention legs and wherein a bottom portion of each retention leg is located adjacent and generally parallel an upper surface of the base section,
wherein the base section extends parallel the planar connector,
wherein both retention member legs and both reinforcement element clamp legs together define an aligned spindle opening adapted to receive a spindle through all the legs.

2. The longitudinal adjuster as claimed in claim 1, wherein the retention member is secured with the closed end to the movable seat rail of one rail pair.

3. The longitudinal adjuster as claimed in 1, wherein the retention member and the reinforcement element are preassembled to form a preliminary subassembly.

4. The longitudinal adjuster of claim 1, wherein the clamp legs extend substantially parallel one other.

5. The longitudinal adjuster of claim 1, wherein the clamp legs have flared end portions.

6. The longitudinal adjuster of claim 1, wherein the base section of the reinforcement element extends substantially parallel a member extending between the retention legs.

* * * * *

UNITED STATES PATENT AND TRADEMARK OFFICE
CERTIFICATE OF CORRECTION

PATENT NO. : 11,745,625 B2
APPLICATION NO. : 16/638163
DATED : September 5, 2023
INVENTOR(S) : Erik Sprenger It is certified that error appears in the above-identified patent and that said Letters Patent is hereby corrected as shown below:

In the Claims

Claim 1, Column 13, Line 11 and 12 should read as follows:
selectively nest about the retention legs, wherein in-
side surfaces of both clamp legs are located adjacent Signed and Sealed this
Seventeenth Day of October, 2023

Katherine Kelly Vidal
*Director of the United States Patent and Trademark Office*